United States Patent [19]

Iijima

[11] Patent Number: 5,519,771
[45] Date of Patent: May 21, 1996

[54] CALLED SUBSCRIBER SELECTING SYSTEM

[75] Inventor: Masami Iijima, Kawasaki, Japan

[73] Assignee: Fujitsu Limited, Kanagawa, Japan

[21] Appl. No.: 93,190

[22] Filed: Jul. 16, 1993

[30] Foreign Application Priority Data

Jul. 17, 1992 [JP] Japan .................................. 4-189772

[51] Int. Cl.⁶ ........................................................ H04M 3/42
[52] U.S. Cl. ............................ 379/201; 379/92; 379/280
[58] Field of Search ............................ 379/92, 97, 266, 379/201, 93, 90, 280

[56] References Cited

U.S. PATENT DOCUMENTS

5,018,736   5/1991   Pearson et al. ........................ 379/92
5,035,422   7/1991   Berman ................................. 379/90

Primary Examiner—Jeff Hofsass
Assistant Examiner—Scott Wolinsky

[57] ABSTRACT

A system for selecting a called subscriber is provided in a telephone switching network for selecting a called subscriber from a plurality of called subscribers who desire to be selected and has a memory for registering identifying information on called subscribers, such as telephone numbers and passwords, in a table arranging the identifying information in the order of count numbers, and a selector for selecting a called subscriber from the called subscribers registered in the memory by a selecting subscriber who makes a call to the network for starting count in a counter provided in a processor and sends a stop signal to the network for stopping the count and producing a counted number for selecting the called subscriber.

4 Claims, 7 Drawing Sheets

FIG. 2a (DSM): DIGITA SWITCHING MODULE

CALLED SUBSCRIBER SELECTING SYSTEM

BACKGROUND OF THE INVENTION

1. Field of the Invention

The present invention relates to a called subscriber selecting system provided in a switching network accommodating a plurality of subscribers and, in particular, relates to a called subscriber selecting system for allowing an origination subscriber to select a called subscriber from a plurality of called subscribers who responded to a collection or a call to select the subscribers, by using the switching network.

2. Description of the Related Art

In a conventional switching network (for example, telephone switching network), when an origination subscriber calls a called subscriber, the switching network connects the origination subscriber to the called subscriber by selecting subscriber identifying information (for example, telephone number) on the called subscriber.

For the case of a conventional switching network which offers a pilot number service, a key subscriber group is provided to a plurality of designated subscribers. When an origination subscriber calls a called subscriber who belongs to the key subscriber group, the switching network connects the origination subscriber to the called subscriber by selecting key group identifying information (for example, pilot number) and connects the origination subscriber to the called subscriber in accordance with a key subscriber selecting system introduced to the switching network.

As is apparent from the above description, the conventional switching network has simply selected a called subscriber on the basis of the subscriber identifying information or the key group identifying information on the called subscriber.

For example, in a lottery supported by a private sponsor, it has recently become frequent that a sponsor collects participants who desire to win or to be selected and selects a winner from the participants. In this case, the advertisement for the collection has been made by using the communication media such as mail or the public media such as newspaper, radio broadcasting, television broadcasting, and participants corresponded to the collection by the communication media such as mail. Meanwhile, upon reception of the written responses, the sponsor selects a winner from the participants and notifies the result of the selection to the winner by the communication media such as mail.

Since telephone communication is now widely spread, it is certainly possible to use the telephone system for responding to the collection and sending the selected result to the winner, but the selection itself is intrinsically the action conducted by the sponsor and it has been impossible to realize such selection through the switching network.

A variety of further services can be provided in addition to or instead of the lottery mentioned above, for selecting particular subscribers by using the telephone system as the communication medium. For example, it is also possible to consider as new service using the telephone system by which a sponsor plans to previously collect a plurality of called subscribers who desire to be selected and make an ordinary or designated origination subscriber who participates in the plan select a called subscriber from the subscribers.

SUMMARY OF THE INVENTION

Therefore, an object of the present invention is to select particular subscribers out of a plurality of subscribers who desire to be selected, in a telephone switching network, and another object of the present invention is to realize the selection simply and at low operation costs.

The object is achieved by providing a called subscriber selecting system externally or internally connected with a central office in a telephone switching network. The system consists of a file memory for storing subscriber information, such as telephone numbers, passwords and additional information on subscribers who desire to select and to be selected, a main memory for storing programs to register the subscriber information, change the subscriber information and select the subscribers to be selected, and a processor for advancing operation of the file and the main memory.

When a sponsor offers a plan for using the system to collect subscribers and select a subscriber from the collected subscribers, the sponsor announces the plan to subscribers by public communication media such as television and radio broadcast. Then, the subscribers who desire to be selected store their subscriber information into the main memory through the telephone switching network, and the subscribers who desire to select inform their subscriber information to the sponsor so that the sponsor store the subscriber information into the main memory.

When a subscriber who desires to select becomes an originating subscriber (ORIG-SUB) and makes a call to the system through the telephone switching network (SWITCH NW) by sending a called subscriber selection service number (SELECT NO.) and his password, the system recognizes that the ORIG-SUB is a subscriber who participates in the sponsor's plan and makes a selection counter provided in the processor start to operate, so that the counter counts up numbers one by one and cyclically in a designated range of numbers.

During the process when the selection counter counts the numbers, ORIG-SUB sends a stop code to the system through SWITCH NW. Receiving the stop code, the counting stops, producing a counted number. A called subscriber information table (CALLED-SUB TABLE) is provided in the file memory for storing the information on the subscribers who desire to be selected as called subscribers (CALLED-SUBs), and the CALLED-SUBs are designated by the count numbers respectively. The counted number in the selection counter is provided so as to be equal to the count number in the CALLED-SUB TABLE respectively, having the same range of numbers. Therefore, the CALLED-SUB can be selected by selecting the same count number as the counted number, from CALLED-SUB TABLE.

Thus, one CALLED-SUB can be selected from CALLED-SUBs by the ORIG-SUB who calls the system and sends the stop code. By virtue of applying the called subscriber selecting system to the telephone switching network, the selection can be done simply and at low operation costs.

BRIEF DESCRIPTION OF THE DRAWINGS

These and other objects as well as advantages of the present invention will become clear by the following description of the preferred embodiments of the present invention with reference to the accompanying drawings, wherein.

DESCRIPTION OF THE PREFERRED EMBODIMENTS

Before describing the preferred embodiment of the present invention, the principle operation of the present invention will be discussed in reference to FIGS. 1(a) to 1(f). Throughout FIGS. 1(a) to 1(f), the same reference numeral designates the same element.

Figure 1A:
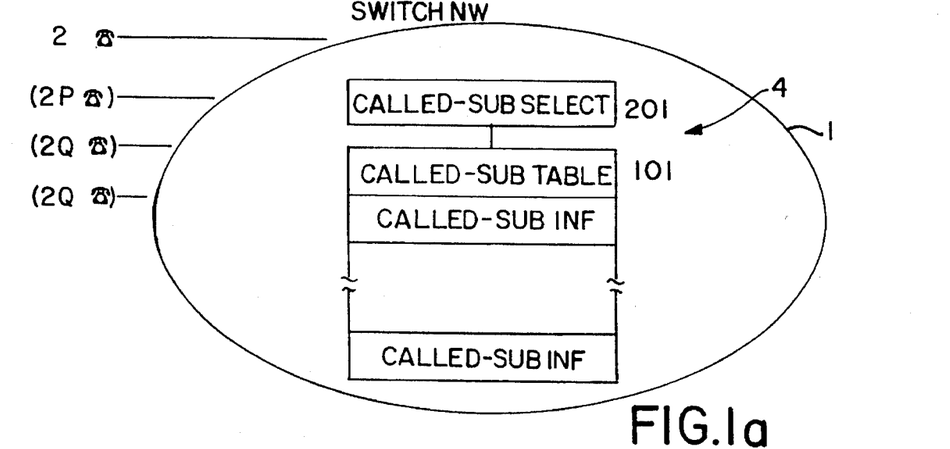
FIG. 1(a) to FIG. 1(f) are diagrams illustrating the principle of the present invention.

In FIG. 1(a), a switching network (SWITCH NW) (1) includes a called subscriber selection system (4) of the present invention and subscribers (2) are accommodated in SWITCH NW 1. A plurality of the subscribers 2 include an origination subscriber 2P and a plurality of called subscribers 2Q. The origination subscriber 2P performs the selection of at least one called subscriber 2Q and the called subscribers 2Q desire to be selected, by using the called subscriber selection system 4 provided in SWITCH NW 1.

The origination subscriber 2P and the called subscribers 2Q are indicated in the parentheses with a mark at a respective telephone set.

The called subscriber selection system 4 in FIG. 1(a) consists of a called subscriber information memory means (101), which will be simply called "called subscriber table (CALLED-SUB TABLE)" hereinafter, for registering called subscriber identifying information (ID), which will be called "called subscriber information (CALLED-SUB INF)" hereinafter, of the called subscribers 2Q and a called subscriber selection means (CALLED-SUB SELECT) (201) for selecting at least one called subscriber 2Q from those 2Q registered in CALLED-SUB TABLE 101 by virtue of "start operation" and "stop operation" performed by the origination subscriber 2P and for connecting the selected called subscriber 2Q to the origination subscriber 2P. The "start operation" and "stop operation" will be explained later.

Figure 1B:
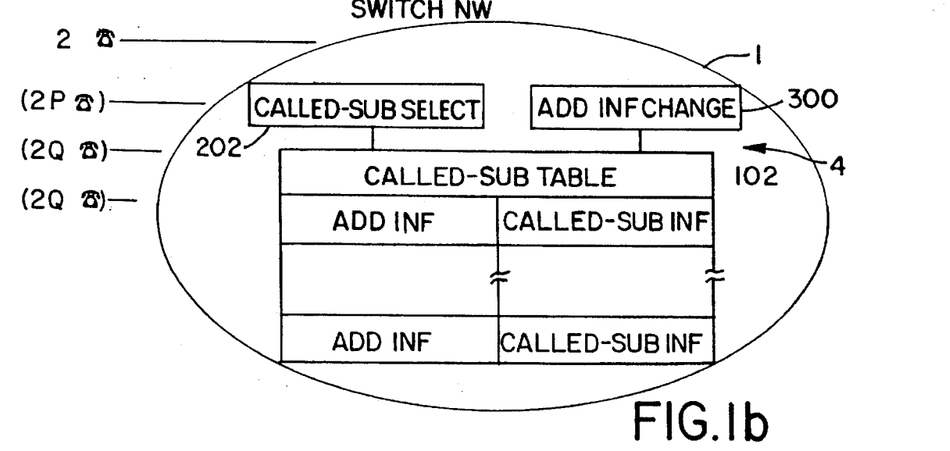

In FIG. 1(b), the called subscriber selection system 4 consists of CALLED-SUB TABLE 102, an added information change means (ADD INF CHANGE) 300 and CALLED-SUB SELECT 202. The CALLED-SUB TABLE 102 is the same as CALLED-SUB TABLE 101 except CALLED-SUB TABLE 102 has an added information (ADD INF) to respective CALLED-SUB INF ID. The ADD INF is information added to CALLED-SUB INF (ID) by the called subscribers when the called subscribers 2Q determine to add their own information on the results of the examination on the collection offered from the sponsor. The ADD INF CHANGE 300 is provided for making the called subscribers 2Q change ADD INF through SWITCH NW 1. The CALLED-SUB SELECT 202 is for selecting at least one called subscriber 2Q having ADD INF satisfying the matter of the collection, from the called subscribers 2Q registered in CALLED-SUB TABLE 102 and for connecting the selected called subscriber 2Q to the origination subscriber 2P. The ADD INF will be explained more concretely later. The selection is performed by virtue of "start operation" and "stop operation" same as in FIG. 1(a).

Figure 1C:
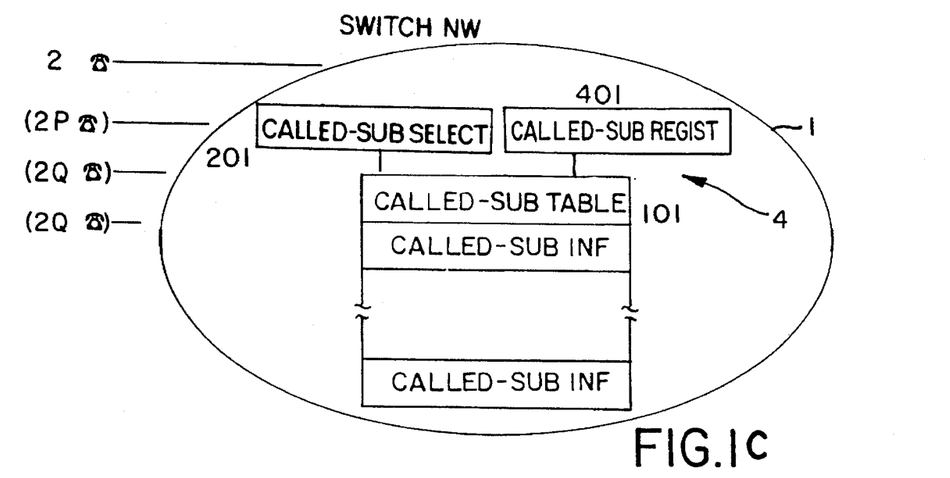

FIG. 1(c) illustrates the called subscriber selection system 4 same as that shown in FIG. 1(a) except that the called subscriber selection system 4 shown in FIG. 1(c) further includes a called subscriber registration means (CALLED-SUB REGIST) (401). The CALLED-SUB REGIST 401 is provided for making the called subscribers 2Q register CALLED-SUB INF (ID) in CALLED-SUB TABLE 101 through SWITCH NW 1.

Figure 1D:
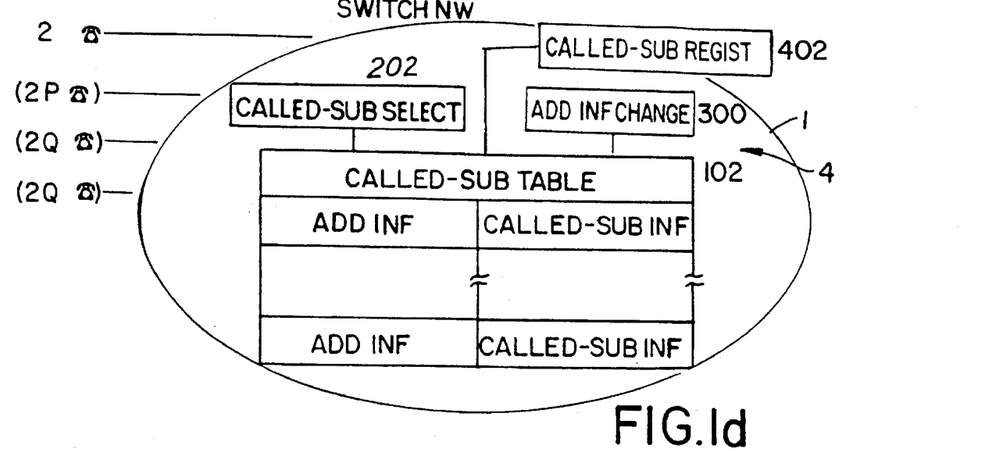

FIG. 1(d) illustrates the called subscriber selection system 4 similar to that shown in FIG. 1(b) except that the called subscriber selection system 4 shown in FIG. 1(d) further includes CALLED-SUB REGIST (402). The CALLED-SUB REGIST 402 is provided for making the called subscribers 2Q register CALLED-SUB INF (ID) and ADD INF in CALLED-SUB TABLE 102 through SWITCH NW 1, respectively.

Figure 1E:
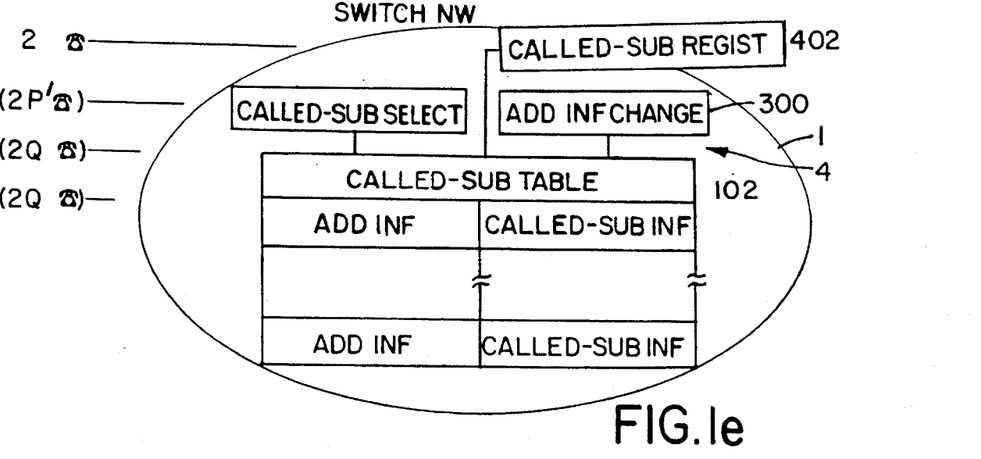

FIG. 1(e) illustrates the called subscriber selection system 4 same as that shown in FIG. 1(d) except that the origination subscriber 2P in FIG. 1(d) is changed to a designated origination subscriber 2P' who is previously designated to perform the selection by using the called subscriber selection system 4.

Figure 1F:
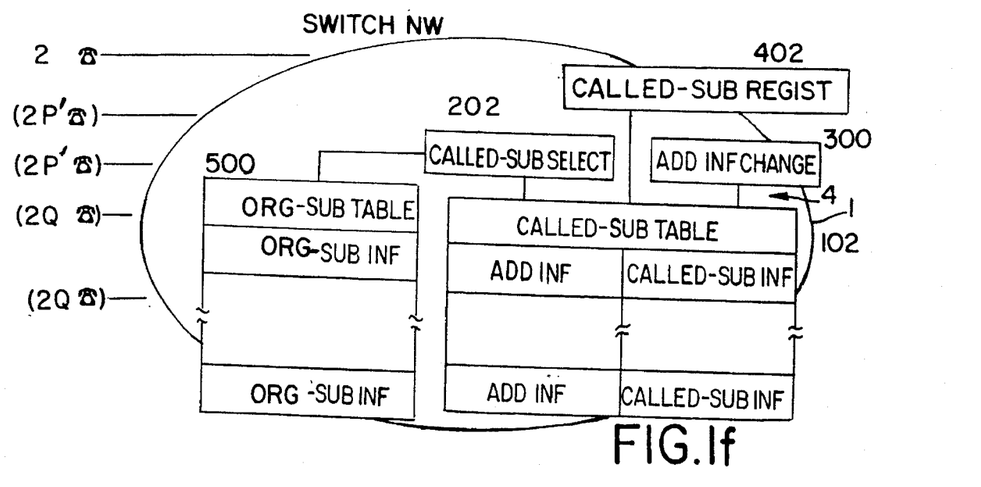

FIG. 1(f) illustrates the called subscriber selection system 4 same as that shown in FIG. 1(d) except that origination subscriber information memory means (500), which will be simply called "origination subscriber table (ORIG-SUB TABLE) 500" hereinafter, for identifying a plurality of origination subscribers 2P' to cover the case where a plurality of origination subscribers 2P' participate in the collection plan offered from the sponsor.

The "start operation" and "stop operation" mentioned above in reference to FIG. 1(a) will be explained below.

The selection is that one called subscriber 2Q is selected from the called subscribers 2Q registered in CALLED-SUB TABLE 101 or 102 by using CALLED-SUB INF given to each of the registered called subscribers 2Q. In CALLED-SUB TABLE 101 or 102, a designated number called "count number" is attached to each registered called subscriber 2Q, the count numbers being different from another subscriber. Many ways can be considered to achieve the selection. However, in the embodiment, the selection is performed by using a counter, which will be called "selection counter", provided in CALLED-SUB SELECT 201 or 202. The selection is performed by the origination subscriber 2P, in CALLED-SUB SELECT 201 or 202.

When the origination subscriber 2P calls the called subscriber selecting system 4 by sending a designated start signal, the selection counter in the called subscriber selecting system 4 starts counting, which is called "start operation".

The counting continues until the origination subscriber 2P sends a designated signal called "stop code". When the selection counter receives the "stop code", the counting stops, producing a counted number obtained at a stop point, and CALLED-SUB SELECT 201 finds "count number" equal to the counted number, in CALLED-SUB TABLE 101, producing selected CALLED-SUN INF (ID). In case of CALLED-SUB SELECT 202, CALLED-SUB SELECT 202 finds the "count number" not only equal to the counted number but also having ADD INF satisfying the matter of the collection offered from the sponsor, which will be explained in detail in reference to a flowchart shown in FIG. 5(a). This is called "stop operation".

By virtue of the "start operation" and "stop operation", the intentional selection is performed.

Here, the collection offered to the subscribers 2 by the sponsor and ADD INF added by the called subscribers 2Q will be explained below with reference to a specific instance.

When a sponsor plans to perform a service, which will be called "selection service" hereinafter, to the subscribers 2 by using the called subscriber selecting system 4, it is considered that there are two cases of selection.

One is the case where an ordinary subscriber participates in the plan of the selection service and becomes the origination subscriber 2P and the other is the case where the designated subscriber becomes the origination subscriber 2P, for performing the selection. The former is a plan to collect the called subscribers 2Q who desire to be selected and make subscribers 2 select a called subscriber 2Q from the collected called subscribers 2Q. The latter is a plan to have a subscriber 2 become the designated origination subscriber 2P and make the designated origination subscriber 2P select a called subscriber 2Q from the collected called subscribers 2Q. In the latter case, there may be a case where the sponsor himself becomes the designated origination subscriber 2P. The ORIG-SUB TABLE 500 in FIG. 1(f) is provided for registering a plurality of designated origination subscribers 2P. The former may be a new selection service. The latter can be applied to any selection such as collection performed in a television commercial.

In the selection service described above, it is convenient that the called subscribers 2Q previously register their CALLED-SUB INF (IDs) in CALLED-SUB TABLE 101 or 102. In case of CALLED-SUB TABLE 102, the called subscribers 2Q can previously register their ADD-INF (ADs) such as their sex distinction, age and occupations through CALLED-SUB REGIST 402. However, if they want to change their ADD-INF, they can change it by using ADD INF CHANGE 300. If they want to reject to be selected, they can do so by using ADD INF CHANGE 300.

The preferred embodiments of the present invention will be explained in reference to FIGS. 2(a), 2(b), 3, 2, 5(a), 5(b), 6 and 7. The like elements are designated by the like reference numerals and symbols throughout FIGS. 1(a) to 1(f), 2(a), 2(b), 3, 2, 5(a), 5(b), 6 and 7.

Figure 2A:
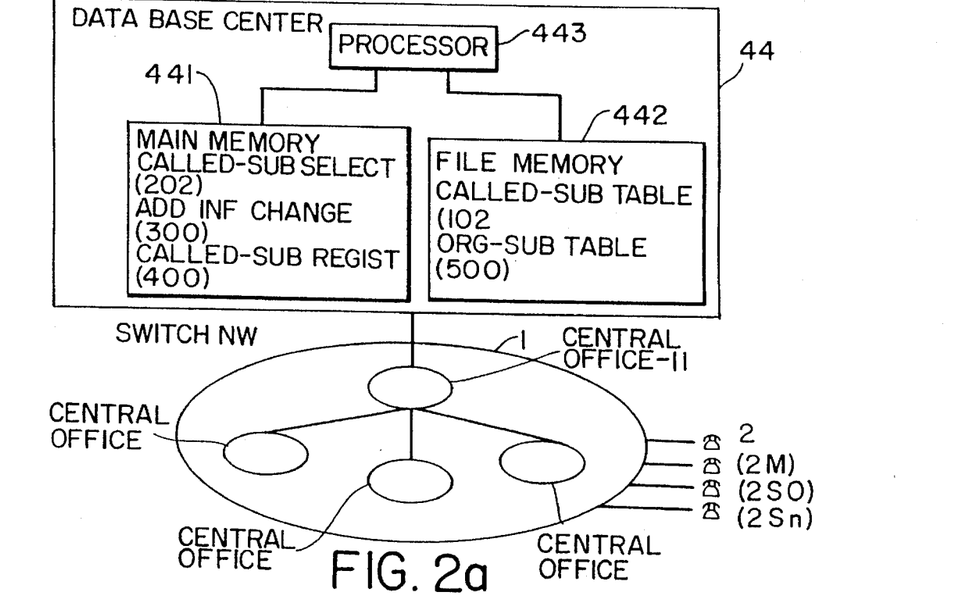
FIG. 2(a) is a diagram for explaining the relationship between the switching network and the termination subscriber selection system of the present invention which is provided at the outside of the switching network and is connected with a central office of the same network.
Figure 2B:
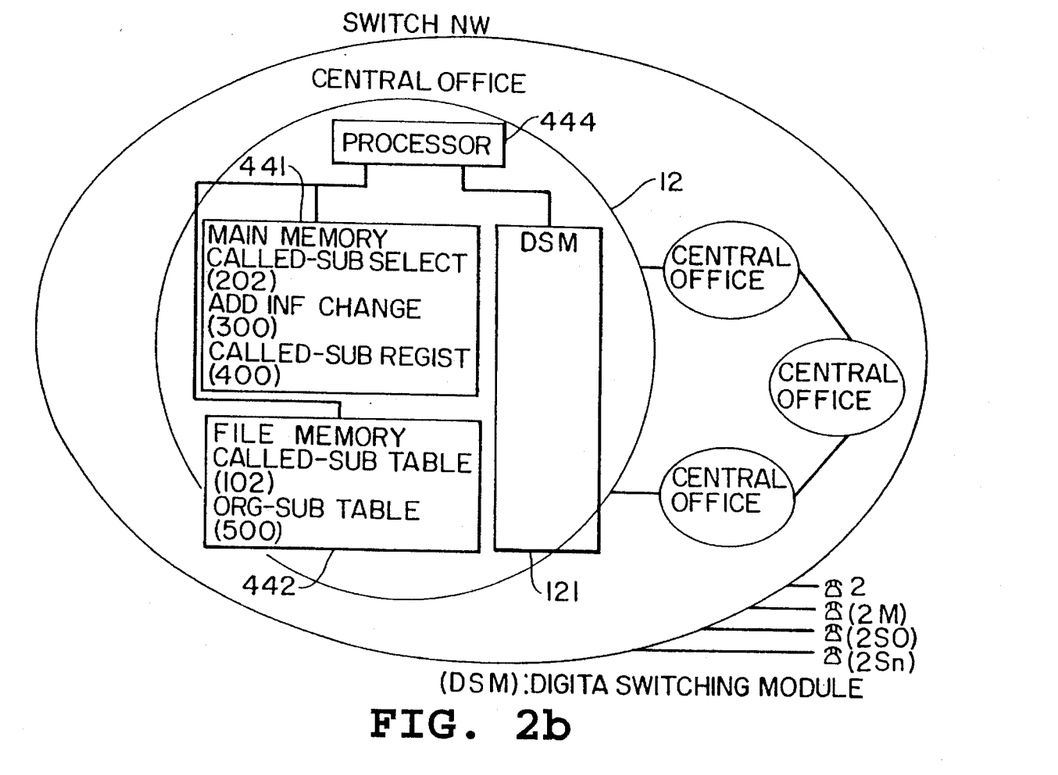
FIG. 2(b) is a diagram for explaining the relationship between the switching network and the termination subscriber selection system of the present invention provided within a switching system of the switching network.

FIGS. 2(a) and 2(b) are diagrams for explaining two examples of the positioning of the called subscriber selecting system 4 and SWITCH NW 1. FIG. 2(a) shows an example where the called subscriber selection system 4 is connected at the outside of CENTRAL OFFICE 12 in SWITCH NW 1, while FIG. 2(b) shows an example where the called subscriber selecting system 4 is connected at the inside of CENTRAL OFFICE in SWITCH NW 1. The called subscriber selecting system 4 of FIG. 2(a) is based on the system 4 described in reference to FIG. 1(f).

The called subscriber selecting system 4 shown in FIG. 2(a) is formed by connecting a data base center (DATA BASE CENTER) 44 provided in the system 4 to the central office (CENTRAL OFFICE) 11 of SWITCH NW 1. The called subscriber selecting system 4 in FIG. 2(a) corresponds to a system used in a case where an individual or a corporation becomes a sponsor of the selection service to subscribers 2 of SWITCH NW 1.

In FIG. 2(a), DATA BASE CENTER 44 consists of a main memory (MAIN MEMORY) 441 storing the operation programs for DATA BASE CENTER 44, a file memory (FAIL MEMORY) 442 storing CALLED-SUB INF (ID) and ORIG-SUB INF (ID') and a processor (PROCESSOR) 443 for processing the operation of these memories. The MAIN MEMORY 441 includes CALLED-SUB SELECT 202, ADD INF CHANGE 300 and CALLED-SUB REGIST 400 which are also shown in FIG. 1(f), while the FILE MEMORY 442 includes CALLED-SUB TABLE 102 and ORIG-SUB TABLE 500.

The called subscriber selecting system 4 shown in FIG. 2(b) corresponds to an example where the system is provided of inside of SWITCH NW 1. This called subscriber selecting system 4 comprises MAIN MEMORY 441, FILE MEMORY 442, a digital switching module (DSM) 121 operating as the well known speech pass controller (SPC) and PROCESSOR 444 for processing the operation for these elements, which are similar to those shown in FIG. 2(a) and are provided in CENTRAL OFFICE 12 in SWITCH NW 1. The called subscriber selecting system 4 in FIG. 2(b) corresponds to the system where an operator of the switching network has become a sponsor of the selection service.

In FIGS. 2(a) and 2(b), reference numeral 2 designates subscribers 2 accommodated in SWITCH NW 1, reference numeral 2M designates an origination subscriber, which will be called "selecting subscriber" hereinafter, who participates in the selection service as a selector, and reference numerals $2S_0 \sim 2S_n$ indicate a plurality of called subscribers 2S, each of which will be called "responding subscriber" hereinafter, who participates in the selection service as a responder to the collection.

A preferred embodiment of the present invention will be described in reference to FIG. 2(a).

The selecting subscriber 2M offers the use of the data base center 44 to the sponsor of the selection service, informing him of the telephone number $DN_M$ and password $PW_M$ of the selecting subscriber 2M. Upon receiving of those telephone number $DN_M$ and password $PW_M$, the sponsor stores them into ORIG-SUB TABLE 500 in FILE MEMORY 442, using PROCESSOR 443.

On the other hand, the subscriber 2 who desires to receive the selection service so as to be selected, registers his telephone number $DN_s$ and password $PW_s$ to CALLED-SUB TABLE 102 in FILE MEMORY 442 as the responding subscriber 2S, through PROCESSOR 443 equivalent to CALLED-SUB REGIST 400 in MAIN MEMORY 441. The process of the registration will be explained below in reference to FIG. 3.

Figure 3:
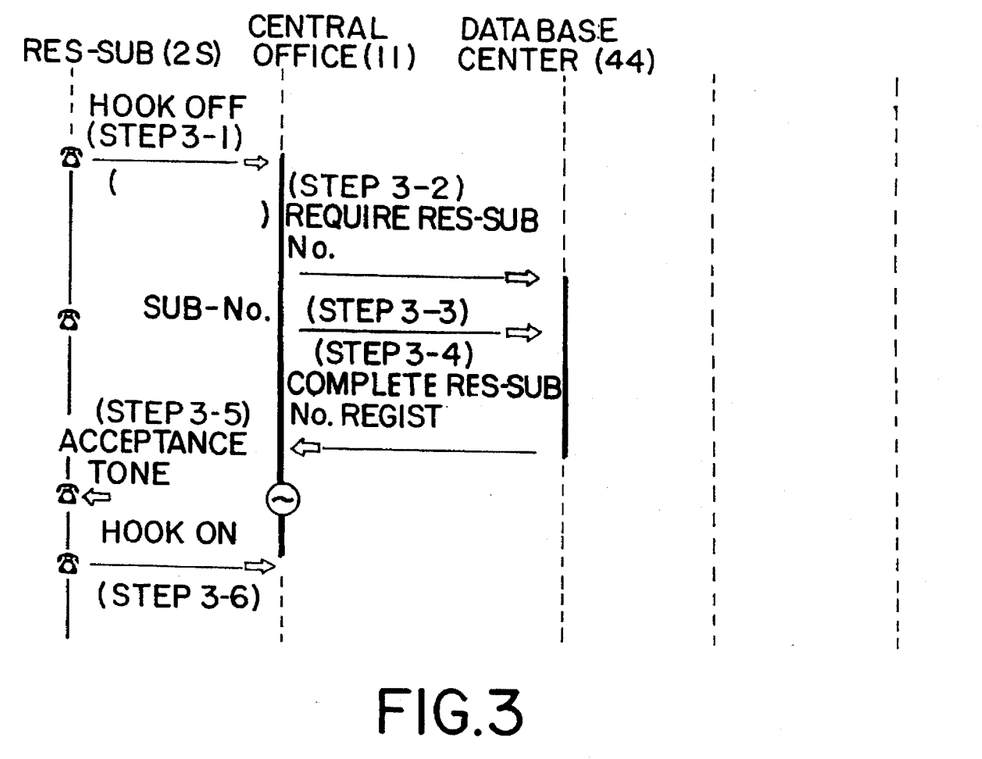
FIG. 3 is a process flowchart showing implementation of the registration of termination subscribers in the termination subscriber selection system of the present invention.

The subscriber 2 who desires to become the responding subscriber (RES-SUB) 2S, sends a called subscriber registration number including his password PW s to SWITCH NW 1 (step 3-1). Upon receiving of the called subscriber registration number, SWITCH NW 1 informs DATA BASE CENTER 44 that registration of the called subscriber registration number is requested (step 3-2). Simultaneously, the subscriber 2 informs the data base center 44 of his telephone number $DN_s$ through SWITCH NW 1 (step 3-3). After having received this information, CALLED-SUB REGIST 400 registers the telephone number $DN_s$ and password $PW_s$ in CALLED-SUB TABLE 102 in FILE MEMORY 442 by using PROCESSOR 443, as CALLED-SUB INF (ID) of the responding subscribers 2S. A select number is given to each responding subscriber 2S, select numbers $PN_0 \sim PN_n$ are given to CALLED-SUB INF $(ID_s)$ in CALLED-SUB TABLE 102 respectively. Therefore, the telephone numbers $DN_{s0} \sim DN_{sn}$ and the passwords $PW_{s0} \sim PW_{sn}$ of the responding subscribers $2S_0 \sim 2S_n$ are stored in CALLED-SUB TABLE 102, corresponding to the count numbers $PN_0 \sim PN_n$ (step S-4). When CALLED-SUB INF (ID) is registered in CALLED-SUB TABLE 102, PROCESSOR 443 informs CENTRAL OFFICE 11 that the registration has ended and thereby CENTRAL OFFICE 11 sends an access tone to the responding subscriber 2S (step 3-5) and the responding subscriber 2S perform a hook-on step (step 3-5), completing the called subscriber registration process.

Moreover, the responding subscriber 2S can change ADD INF in CALLED-SUB TABLE 102 by using ADD INF CHANGE 300 when responding subscriber 2S requires the change after examining the matter of the collection offered from the sponsor. In CALLED-SUB TABLE 102, ADD INF on the responding subscribers 2S are stored corresponding to count numbers $PN_0 \sim PN_n$, using an act code such as logic "1" and "0". There is a case where the responding subscriber 2S admits or rejects to be selected after examining the conditions of the collection. When the responding subscriber 2S admits to be selected, he can use act code "1" as ADD INF on admitting selection. When the responding subscriber 2S rejects to be selected, he can use act code "0" as ADD INF on rejecting selection. The above act code "1" or "0" is an example of ADD INF, and this example will be used in the explanation of a flowchart shown in FIG. 5(a).

Figure 4:
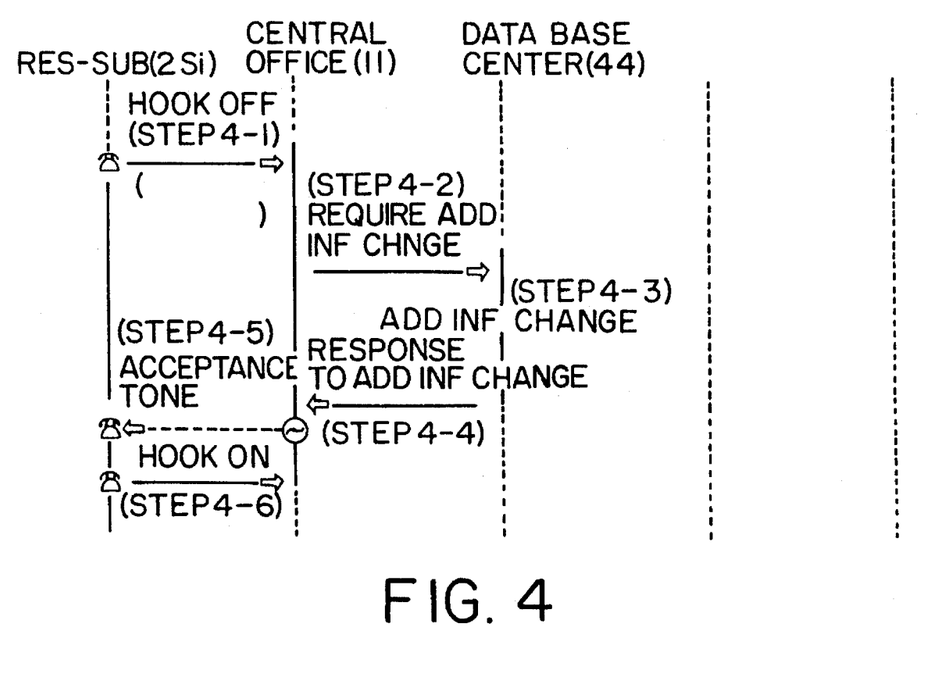
FIG. 4 is a process flowchart showing implementation of the termination state change by termination subscribers in the termination subscriber selection system of the present invention.

Change of ADD INF by the responding subscriber (RES-SUB) 2S is shown in a flowchart in FIG. 2. In the flowchart, the responding subscriber 2S who desires to change ADD INF is represented by $2S_i$ (i is some number between 0 and n). In the explanation of the flowchart, act code "1" for admitting the selection, in other words, for admitting termination and act code "0" for rejecting the selection, in other words, for rejecting termination, are taken as an example of ADD INF.

The responding subscriber 2S, transmits, to CENTRAL OFFICE 11, an added information change number consisting of the termination admitting number $AC_1$ (for example, "#990#") for admitting the termination or the termination rejecting number $AC_2$ (for example, "#991#") for not admitting the termination, his telephone number $DN_{si}$ and password $PW_{si}$ (step 4-1). The CENTRAL OFFICE 11 notifies that the change of ADD INF is requested from responding subscriber $2S_i$ to DATA BASE CENTER 44 (step 2-2). The PROCESSOR 443 makes inquiry to CALLED-SUB TABLE 102 in FILE MEMORY 442 and confirms that the subscriber is the responding subscriber $2S_i$ by the comparison with the password $PW_{si}$ in CALLED-SUB TABLE 102 to check whether the act code in CALLED-SUB TABLE 102 is "1" or "0". Thereby, the act code is changed to "1" or "0" depending on ADD INF $AC_1$ or $AC_2$ (step 4-3). When the act code is changed, it is informed to CENTRAL OFFICE 11 from DATA BASE CENTER 44 (step 4-4), and CENTRAL OFFICE 11 sends access tone to the responding subscriber $2S_i$ (Step 4-5). Upon receiving of the access tone, the responding subscriber $2S_i$ makes hook on (step 4-6), completing the change process of ADD INF.

Figure 5A:
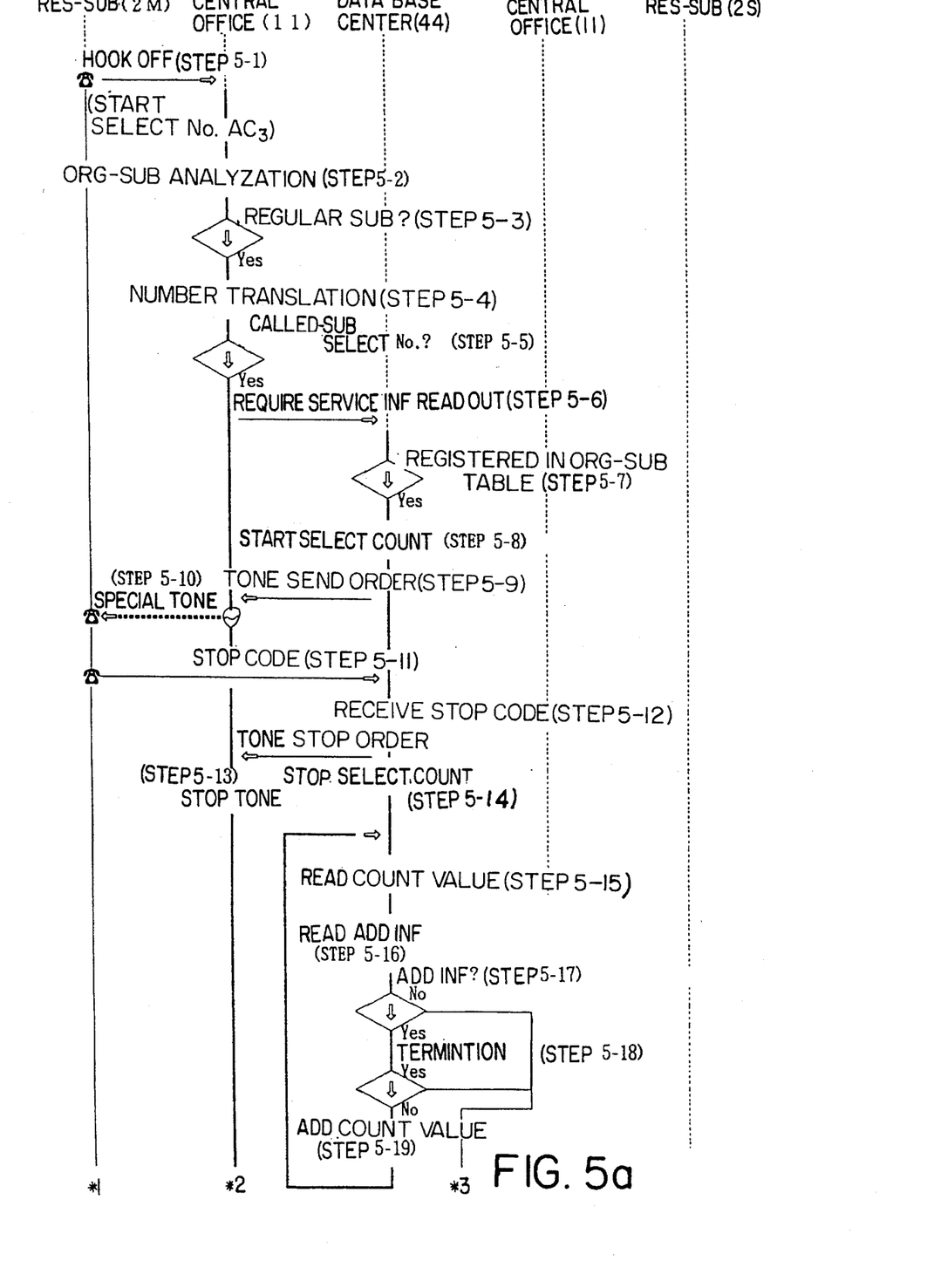
FIGS. 5(a) to 5(b) are process flowcharts showing implementation of selection of the termination subscribers through the switching network by an origination subscriber in the termination subscriber selection system of the present invention.
Figure 5B:
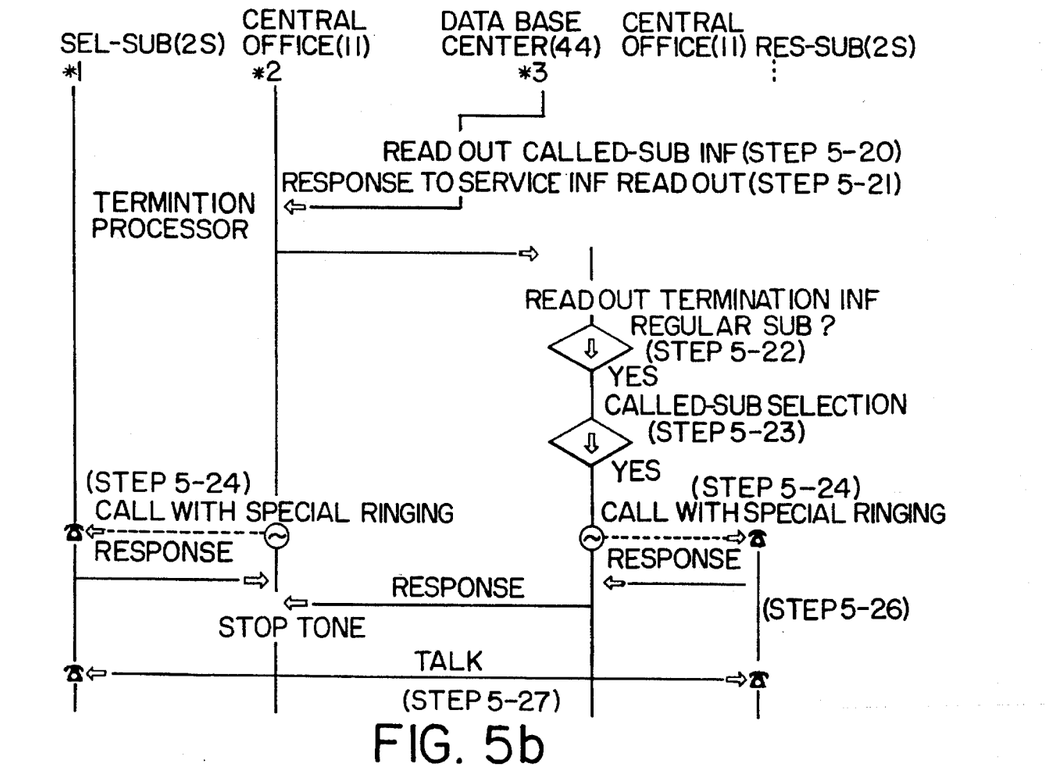
Figures 6A, 6B, 6C, 7:
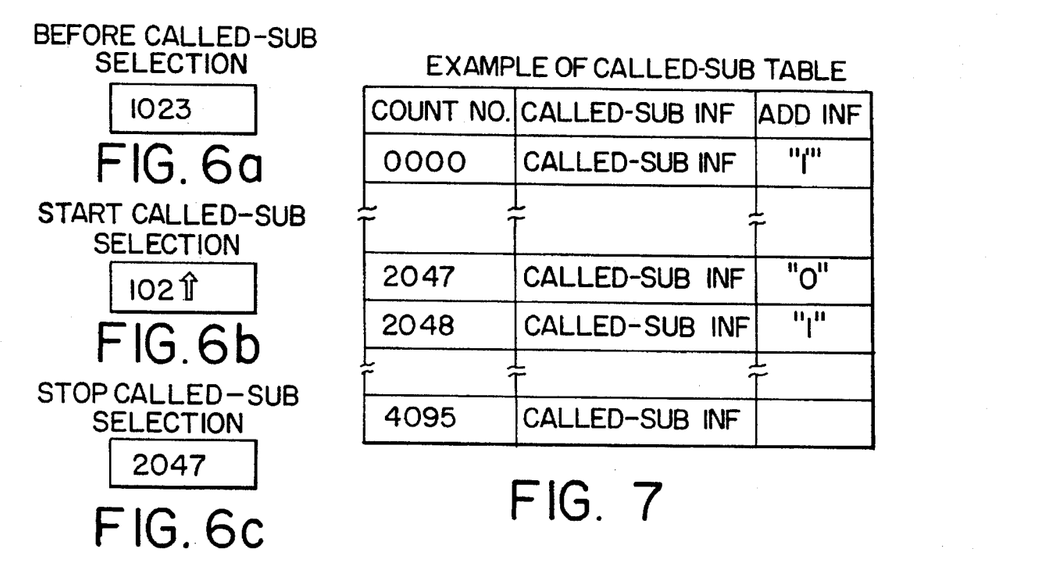
FIG. 6(a) is an example of a counted number produced from the selection counter before the start of the counting operation.
FIG. 6(b) is an example of the counted number for illustrating how the number is counted up in the counting operation.
FIG. 6(c) is another example of the counted number produced by virtue of a stop code.
FIG. 7 is an example of a content of the called subscriber table.

The subscriber selection process performed by the selecting subscriber 2M will then be explained in reference to FIGS. 5(a), 5(b), 6(a), 6(b), 6(c) and 7. FIGS. 5(a) and 5(b) are the flowcharts of the selection process. FIGS. 6(a), 6(b) and 6(c) show an example of counted numbers produced from PROCESSOR 443, used for selecting the responding subscriber 2S. FIG. 7 shows an example of CALLED-SUB TABLE 102. In FIGS. 5(a) and 5(b), the same numerals or symbols as in FIG. 2(a) designates the same part as in FIG. 2(a), and throughout FIGS. 5(a), 5(b), 6(a), 6(b), 6(c) and 7, the same reference numerals or symbols designates the same parts.

FIGS. 5(a) and 5(b) show a continuous chart which is divided only for the convenience of illustration into two parts.

The sponsor who plans to perform the collection or selection service, officially communicates his plan to the subscriber 2 by using an official communication means (for example, television, radio, newspaper, direct male or the like). The responding subscribers 2S examine the matter of the collection or selection service and perform the change of ADD INF if necessary. In the explanation of the flowchart shown in FIGS. 5(a) and 5(b), information on the admission or rejection of the termination will be taken as ADD INF. Therefore, in accordance with the flowchart shown in FIGS. 5(a) and 5(b), the selecting subscriber 2M selects one responding subscriber 2S having act code "1" from the responding subscribers $2S_0 \sim 2S_n$ registered in CALLED-SUB TABLE 102, so that the selecting subscriber 2M is connected with the selected responding subscriber 2S through SWITCH NW 1.

In FIG. 5(a), the selecting subscriber 2M originates a call to SWITCH NW 1 to send the predetermined called subscriber selection service number (SELECT NO.) $AC_3$ (for example, "#999#") and his password $PW_M$ (step 5-1). Upon acceptance of the call originated from the selecting subscriber 2M, CENTRAL OFFICE 11 analyzes the origination subscriber (step 5-2). When the selecting subscriber 2M is found to be an ordinary subscriber (step 5-3), the central office 11 executes the translation of codes and numerals (step 5-2). As a result, when the received codes and numerals are found to be the termination subscriber selection service number ($AC_3$) (step 5-5), CENTRAL OFFICE 11 connects the selecting subscriber 2M to DATA BASE CENTER 44 and transfers the termination subscriber selection service number $AC_3$, password $PW_M$ and telephone number $DN_M$ of the selected subscriber 2M to DATA BASE CENTER 44 for requesting the readout of the information sent from the selecting subscriber 2M (step 5-6).

Then, in DATABASE CENTER 44, PROCESSOR 443 collates the telephone number $DN_M$ and password $PW_M$ transferred from CENTRAL OFFICE 11 with ORIG-SUB TABLE 500 and confirms that the selecting subscriber 2M is already registered (step 5-7).

After the confirmation, the "start operation" described above is performed. That is, PROCESSOR 443 triggers CALLED-SUB SELECT 202 so that CALLED-SUB SELECT 202 makes the selection counter provided in CALLED-SUB SELECT 202 initiate and advance counting one by one and cyclically from 0 to n (step 5-8). At the same time, PROCESSOR 443 instructs the central office 11 to transfer a signal tone to notify that the "start operation" begins (step 5-9). The CENTRAL OFFICE 11, after having received the instruction, starts to send a special tone to selecting subscriber 2M for informing that subscriber that the counting operation starts and continues (step 5-10).

The counting operation of the selection counter provided in PROCESSOR 223 will be explained in reference to FIGS. 6(a), 6(b) and 6(c) and FIG. 7. FIGS. 6(a), 6(b) and 6(c) show an example of counted numbers changing in the counting process and FIG. 7 shows an example of CALLED-SUB TABLE 102 having a a storing capacity for the responding subscribers 2S as many as 4096 (from 0000 to 4095) subscribers and ADD INF represented by act codes "1" and "0".

When the selection process of the called subscriber selecting system 4 advances to "start operation", the selection counter provided in PROCESSOR 443 counts up the numbers one by one by providing a predetermined interval, until the counted number reaches the maximum number in view of the counting capacity of the selection counter and returns to the minimum number and again counts up cyclically. FIGS. 6(a), 6(b) and 6(c) are for explaining the above process in detail.

When the counted number produced from the selection counter is 1023 before "start operation" as shown in FIG. 6(a), the counted number increases at the first figure of the counted number, one by one as shown by an arrow mark in FIG. 6(b).

When an adequate time has passed from the time when the selecting subscriber 2M began to hear the special tone, the selecting subscriber 2M stops the selection counting by sending a stop code (SC) (for example, "#") to the called subscriber selecting system a through SWITCH NW 1 (step 5-11).

Having received the stop code SC (step 5-12), CALLED-SUB SELECT 202 instructs the selection counter (in PROCESSOR 443) to continue the counting of a pointer to stop the counting and also instructs CENTRAL OFFICE 11 to stop transmission of the special tone. Thereby, the transmission of the special tone to the selecting subscriber 2M from CENTRAL OFFICE 11 stops (step 5-13) and the counting by the selection counter stops (step 5-14). The above operation is the "stop operation" mentioned above.

After stopping the counting by the selection counter in PROCESSOR 443, PROCESSOR 443 reads the counted value (number) from the selection counter (step 5-15) and ADD INF in a column having a count number the same as the counted value, from CALLED-SUB TABLE 102 (step 5-16). After reading ADD INF, PROCESSOR 443 firstly investigates whether there is ADD INF (step 5-17). Since, in this embodiment, ADD INF is information on whether responding subscriber 2S admits (act code "1") or rejects (act code "0") the conditions of the collection, PROCESSOR 443 secondly investigates whether the act code is "1" (Yes) or "0" (No) (step 5-18).

If act code "0" is obtained in the second investigation step, it does not make sense to select the responding subscriber 2S corresponding to the act code "0". In this case, PROCESSOR 443 instructs the selection counter to add one count more (step 5-19), and repeat the above steps 5-15, 5-16, 5-17 and 5-18 and here step 5-19 until act code "1" (Yes) is obtained at step 5-19.

FIG. 7 shows an example of the content of CALLED-SUB TABLE 102. In FIG. 7, if count number 2047 is obtained at step 5-18, PROCESSOR 423 performs one more count up by the selection counter. Adding one more count, if the new count number becomes 2048 and the column of count number 2048 includes act code "1", it is not necessary to repeat step 5-19. The processor 443 determines that the new count number is a selected count number, and the process is advanced along a line of flow having mark *3.

If there is no ADD INF at step 5-17, it is not necessary to advance the selection process toward step 5-18. In this case, the selection process is advanced to flow *3 the same as mentioned above.

In FIG. 5(b), as shown by flow *3, PROCESSOR 443 reads CALLED-SUB INF corresponding to the selected count number (2048 in FIG. 7) from CALLED-SUB TABLE 102 (step 5-20) and sends the read CALLED-SUB INF to CENTRAL OFFICE 11 as the response to the termination subscriber selection service number $AC_3$ sent from the selecting subscriber 2M (step 5-21).

The CENTRAL OFFICE 11 performs a termination process by using a telephone number included in CALLED-SUB INF selected by PROCESSOR 443.

The CENTRAL OFFICE 11 investigates whether a called subscriber determined from CALLED-SUB INF is the ordinary subscriber (step 5-22). If it is determined that the called subscriber is the ordinary subscriber, CENTRAL OFFICE 11 confirms that the call is either to the ordinary called subscriber or to responding subscriber 2S who uses the called subscriber selecting system 4 (step 5-23). When it is confirmed that the call is to responding subscriber 2S, CENTRAL OFFICE 11 calls the responding subscriber 2S and selecting subscriber 2M, using special ringing (steps 5-22 and 5-25). By virtue of the ordinary origination and termination process (step 5-26), the speech pass is provided between the selecting subscriber 2M and the responding subscriber 2S (step 5-27).

In step 5-5 in FIG. 5(a), if the number received from the origination subscriber is not the called subscriber selection service number, CENTRAL OFFICE 11 determines that the origination subscriber is not the selecting subscriber 2M, so that CENTRAL OFFICE 11 does not connect the origination subscriber with DATA BASE CENTER 44. In step 5-7, if the origination subscriber is not registered in ORIG-SUB TABLE 500, PROCESSOR 443 determines that the origination subscriber is not the selecting subscriber 2M, so that DATA BASE CENTER 44 does not accept the origination subscriber, which is informed to the origination subscriber through CENTRAL OFFICE 11.

In step 5-22 in FIG. 5(b), if the called subscriber determined from the read CALLED-SUB INF, that the process is interrupted the fact of the interruption is informed to the origination subscriber. In step 5-23, if the call is a call of the ordinary telephone, CENTRAL OFFICE 11 does not send the special ringing and the fact of the above is informed to the selecting subscriber 2M.

The embodiment explained in reference to FIG. 5(a) and 5(b) is based on a case where DATA BASE CENTER 44 is placed outside of CENTRAL OFFICE 11 as shown in FIG. 2(a). However, the process flow is same as the process flow shown in FIG. 5(a) and 5(b) in a case where the called subscriber selecting system 4 is provided inside CENTRAL OFFICE 11.

As will be apparent from above explanation, the selection of the responding subscriber 2S can be made by the selecting subscriber 2M who sends the termination subscriber selection service number $AC_3$ for making the selection counter start counting and the stop code for making the selection counter stop, to SWITCH NW, and any of responding subscribers 2S registered in CALLED-SUB TABLE 102 can change, whenever desired, ADD INF, for example, the termination admitting state and termination rejection state, by selecting the termination admitting number $AC_1$ or termination rejecting number $AC_2$.

In addition, that the switching network 1 of the present invention is not limited only to the embodiments shown in the figures.

While the preferred embodiments of the present invention have been described, it is to be understood that further modifications will be apparent to those skilled in the art without departing from the spirit of the invention.

The scope of the invention, therefore, is to be determined solely by the following claims.

What is claimed is:

1. A called subscriber selecting system provided in a telephone switching network connected to a selecting subscriber who performs a selection, by using the telephone switching network, of at least one of a plurality of previously registered called subscribers, said called subscriber selecting system comprising:

called subscriber information memory means for registering called subscriber identifying information of said plurality of called subscribers, wherein said subscribers send identifying information thereof to the telephone switching network by calling the called subscriber selecting system through said telephone switching network, said memory means including a register for registering said identifying information about said called subscribers with respective counting numbers; and called subscriber selection means including counter means, coupled to said memory means, for selecting at least one called subscriber from said called subscribers registered in said register of said called subscriber information memory means and sending information about said at least one called subscriber selected therein to said selecting subscriber, selection being performed in said selection means by start and stop operation of said counter means which receives a start signal and a stop signal, respectively, from said selecting subscriber via said telephone switching network, said counter means, upon receiving said stop signal producing a counted number which when it coincides with a respective counting number in said register of said memory means identifies a selected subscriber the identifying information of which has been registered with said counting number.

2. A called subscriber selecting system according to claim 1, wherein said registered subscriber identifying information includes telephone numbers and passwords of said called subscribers.

3. A called subscriber selecting system according to claim 1, further comprising selecting subscriber information memory means for registering selecting subscriber identifying information about a plurality of selecting subscribers who perform a selection of respective previously registered called subscribers.

4. A called subscriber selecting system according to claim 3, wherein registered selecting subscriber identifying information includes telephone numbers and passwords of said selecting subscribers.

* * * * *